US010742015B2

(12) United States Patent
Simonsohn et al.

(10) Patent No.: US 10,742,015 B2
(45) Date of Patent: Aug. 11, 2020

(54) DRY TERMINATION FOR A HIGH-VOLTAGE ELECTRIC CABLE

(71) Applicant: Tyco Electronics Raychem GmbH, Ottobrunn (DE)

(72) Inventors: Thilo Simonsohn, Ottobrunn (DE); Alexander Eigner, Munich (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 0 days.

(21) Appl. No.: 16/680,603

(22) Filed: Nov. 12, 2019

(65) Prior Publication Data
US 2020/0083693 A1 Mar. 12, 2020

Related U.S. Application Data

(63) Continuation of application No. PCT/EP2018/062178, filed on May 10, 2018.

(30) Foreign Application Priority Data

May 15, 2017 (DE) .......................... 10 2017 208 126

(51) Int. Cl.
*H02G 15/064* (2006.01)
*H02G 1/14* (2006.01)

(52) U.S. Cl.
CPC ............. *H02G 15/064* (2013.01); *H02G 1/14* (2013.01)

(58) Field of Classification Search
CPC ......... H02G 15/064; H02G 1/14; H02G 15/06
USPC ....................................................... 174/74 R
See application file for complete search history.

(56) References Cited

U.S. PATENT DOCUMENTS

| 4,074,926 A | * | 2/1978 | Broad | ................... | H01R 13/53 439/89 |
| 4,757,159 A | | 7/1988 | Dejean | | |
| 5,166,477 A | * | 11/1992 | Perin, Jr. | ............... | H01R 24/40 174/113 C |

(Continued)

FOREIGN PATENT DOCUMENTS

| EP | 0683555 A1 | 11/1995 |
| JP | 5061033 B2 | 10/2012 |
| JP | 2016010282 A | 1/2016 |

OTHER PUBLICATIONS

PCT Notification, The International Search Report and the Written Opinion of the International Searching Authority, Intl App No. PCT/EP2018/062178, dated Aug. 2, 2018, 14 pages.

(Continued)

*Primary Examiner* — Sherman Ng

(57) ABSTRACT

A termination for a high-voltage electric cable includes an insulating housing, a fastening device fastening a first section of the termination to a mounting base, an electrical duct extending inside the insulating housing along a longitudinal axis of the insulating housing from the first section to a top end of the termination, the first section arranged between the top end of the termination and a second end of the termination, and a conductor shank disposed at the top end for fastening an electrical conductor to the electrical duct. The fastening device is a fastening ring that is electrically insulating and rigid. The electrical duct includes an electrically conductive tube and a connection portion attaching to a cable connector of the high-voltage electric cable. The fastening ring at least partly encompasses the electrical duct.

22 Claims, 7 Drawing Sheets

(56) References Cited

U.S. PATENT DOCUMENTS

| | | | |
|---|---|---|---|
| 6,265,663 B1* | 7/2001 | Cicogna | H02G 15/06 174/73.1 |
| 6,333,462 B1 | 12/2001 | Quaggia | |
| 6,677,528 B2 | 1/2004 | Amerpohl et al. | |
| 2002/0056564 A1* | 5/2002 | Quaggia | H02G 15/06 174/74 R |
| 2010/0175907 A1* | 7/2010 | Adachi | H02G 15/064 174/73.1 |
| 2016/0329131 A1 | 11/2016 | Murata | |

OTHER PUBLICATIONS

English translation of JP2016010282A, translated Aug. 2, 2018, 11 pages.

* cited by examiner

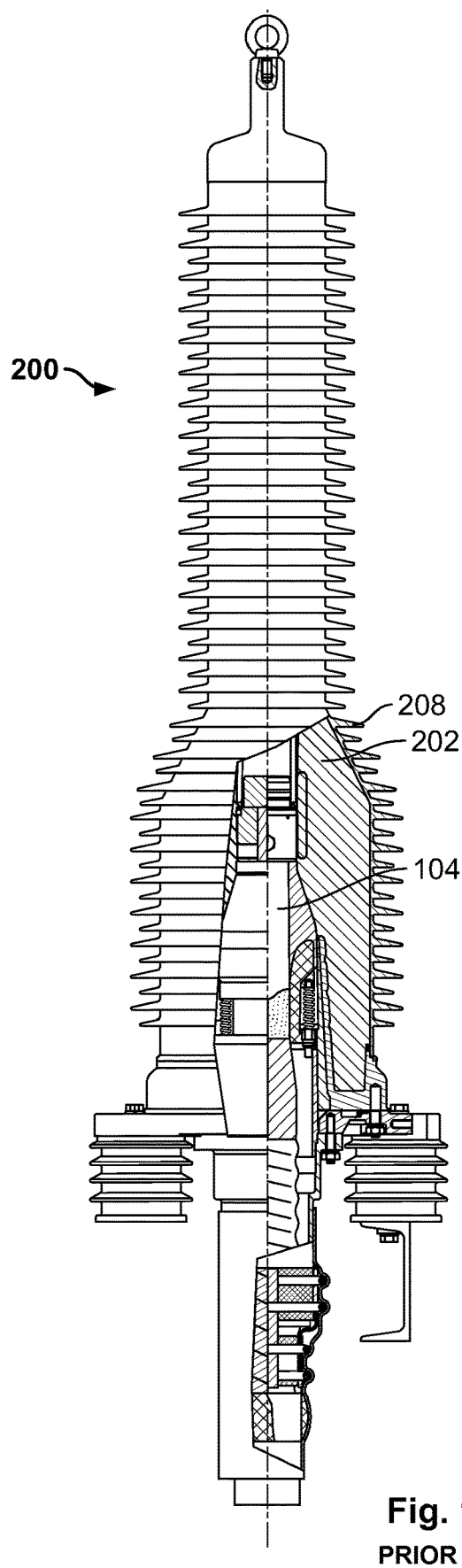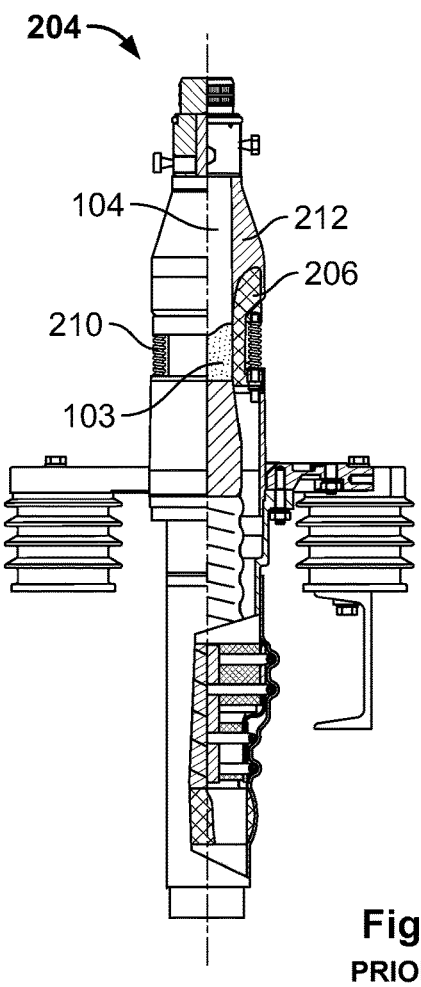
Fig. 1A
PRIOR ART
Fig. 1B
PRIOR ART

DRY TERMINATION FOR A HIGH-VOLTAGE ELECTRIC CABLE

CROSS-REFERENCE TO RELATED APPLICATIONS

This application is a continuation of PCT International Application No. PCT/EP2018/062178, filed on May 10, 2018, which claims priority under 35 U.S.C. § 119 to German Patent Application No. 102017208126.0, filed on May 15, 2017.

FIELD OF THE INVENTION

The present invention relates to a termination and, more particularly, to a termination for a high-voltage electric cable.

BACKGROUND

Outdoor terminations are used for connecting a cable to an electric overhead line. The outdoor terminations usually include a housing and an insulating covering provided with a device for connection to a support pylon. At an inside of the housing, an end portion of the cable is devoid of its outer screening layer and provided with a field control element. The conductor of the cable extends until the end of the insulating covering, to be brought into communication with the overhead line.

The insulating covering commonly consists of a porcelain element performing the function of ensuring insulation between the end portion of the live cable conductor and the earthed supporting structure of the terminal. The insulating covering has a surface extension sufficient to restrain the current passage along the outer surface of the terminal.

An electric cable of the extruded insulating type mainly includes a central conductor consisting for example of a metal cord, made of copper or the like, coated with a semiconductive layer, an insulating layer, a screen electrically earthed, and a protection sheath.

At its entry into the terminal, the cable is devoid of the sheath and screen, and field control elements are used for restraining the electric field gradients at the screen end. Field control element can be either a suitably radiated conductive body, usually referred to as electrode or baffle, commonly made of a semiconductive elastomeric material incorporated in a body of insulating material, the whole being sized so as to keep the electric field gradient within acceptable limits, or a material having a variable dielectric constant and conductivity depending on the electric gradient, or a capacitor system.

A termination for outdoor environments in particular may include a base plate to which the base of a ribbed body made of porcelain is linked, to the upper end of which the cable conductor is connected through appropriate supporting and connecting elements. An earth electrode and a field control cone, of elastomeric material, is forced onto the cable insulating surface within a cylinder of epoxy resin, at its entry into the ribbed body, whereas the free space within the ribbed body is filled with an electrically insulating oil.

The insulating oil within the porcelain covering attempts to eliminate the air subjected to possible ionization where the electric field is higher, which brings about impairment of the terminal integrity. Such a conventional terminal is mounted in an upright position, being linked at the base thereof to a bearing structure. The rigid material of the housing provides the mechanical support of the termination.

However, leaking oil filling may cause environmental issues and it can lead to product failure. Moisture ingress may degrade the electrical performance of the oil filling which might cause product failure as well. So-called "dry" terminations avoid any of these problems and furthermore dispense with the manual process of handling liquid oils in the field.

There exist several concepts for dry HV terminations. For example, FIG. 1A shows a conventional termination 200 comprises a thick wall epoxy housing 202, a so-called "PHVX type" plug-in connection 204 (see FIG. 1B) to the inner conductor of a cable 104 and a thin wall silicone shed molding 208. A silicone stress cone 212 with a conductive deflector 206 is provided in the region where the electrically conductive insulation screen 103 of the cable 104 has been removed. The mechanical stability and stiffness needed for the upright or angled mounting position is provided by the rigidity of the electrically insulating housing 202. In order to guarantee a sufficient mechanical stability of the plug-in connection 204, a spring loaded compression ring 210 is provided at the stress cone 212.

A similar concept is illustrated in U.S. Pat. No. 6,677,528 B2. Furthermore, it is known from U.S. Pat. No. 4,757,159 to use a plurality of long rod insulators to stabilize a non-self-supporting termination. A further known product uses a hollow-core insulator and a factory done gel filling instead of liquid silicone oil filling. U.S. Pat. No. 6,333,462 discloses a dry termination using a metal rod with epoxy resin layer around it as the load carrying element. In particular, U.S. Pat. No. 6,333,462 discloses a massive metal rod plus rigid resin overmolding over the entire length of the termination.

European Patent Application No. 0683555 A1 discloses another terminal for a high-voltage electric cable, devoid of insulating oil or deformable fillers, wherein a stiff insulating tubular element is provided with at least one conductive tubular portion. The conductive tubular portion is electrically connected to the upper end portion of the bare conductor and is disposed around the insulating layer of the cable from which the semiconductive screen has been removed. The inner cable conductor extends through the complete length of the termination and is connected with a top plate that is attached to the overhead line. A ribbed coating of elastomeric material is fitted on the tubular element. The stiff tubular element and the conductive portion rest on an insulating housing providing electric field control means at its inside, which means is disposed about the cable starting from the area where the screen has been removed. The tubular element and the conductive portion form a screen and a structure designed to withstand the cable weight and the transverse forces.

SUMMARY

A termination for a high-voltage electric cable includes an insulating housing, a fastening device fastening a first section of the termination to a mounting base, an electrical duct extending inside the insulating housing along a longitudinal axis of the insulating housing from the first section to a top end of the termination, the first section arranged between the top end of the termination and a second end of the termination, and a conductor shank disposed at the top end for fastening an electrical conductor to the electrical duct. The fastening device is a fastening ring that is electrically insulating and rigid. The electrical duct includes an electrically conductive tube and a connection portion attaching to a cable connector of the high-voltage electric cable. The fastening ring at least partly encompasses the electrical duct.

BRIEF DESCRIPTION OF THE DRAWINGS

The invention will now be described by way of example with reference to the accompanying Figures, of which:

FIG. 1A is a sectional side view of a conventional termination;

FIG. 1B is a sectional side view of a plug-in connection of the conventional termination of FIG. 1A;

DETAILED DESCRIPTION OF THE EMBODIMENT(S)

Figure 2:
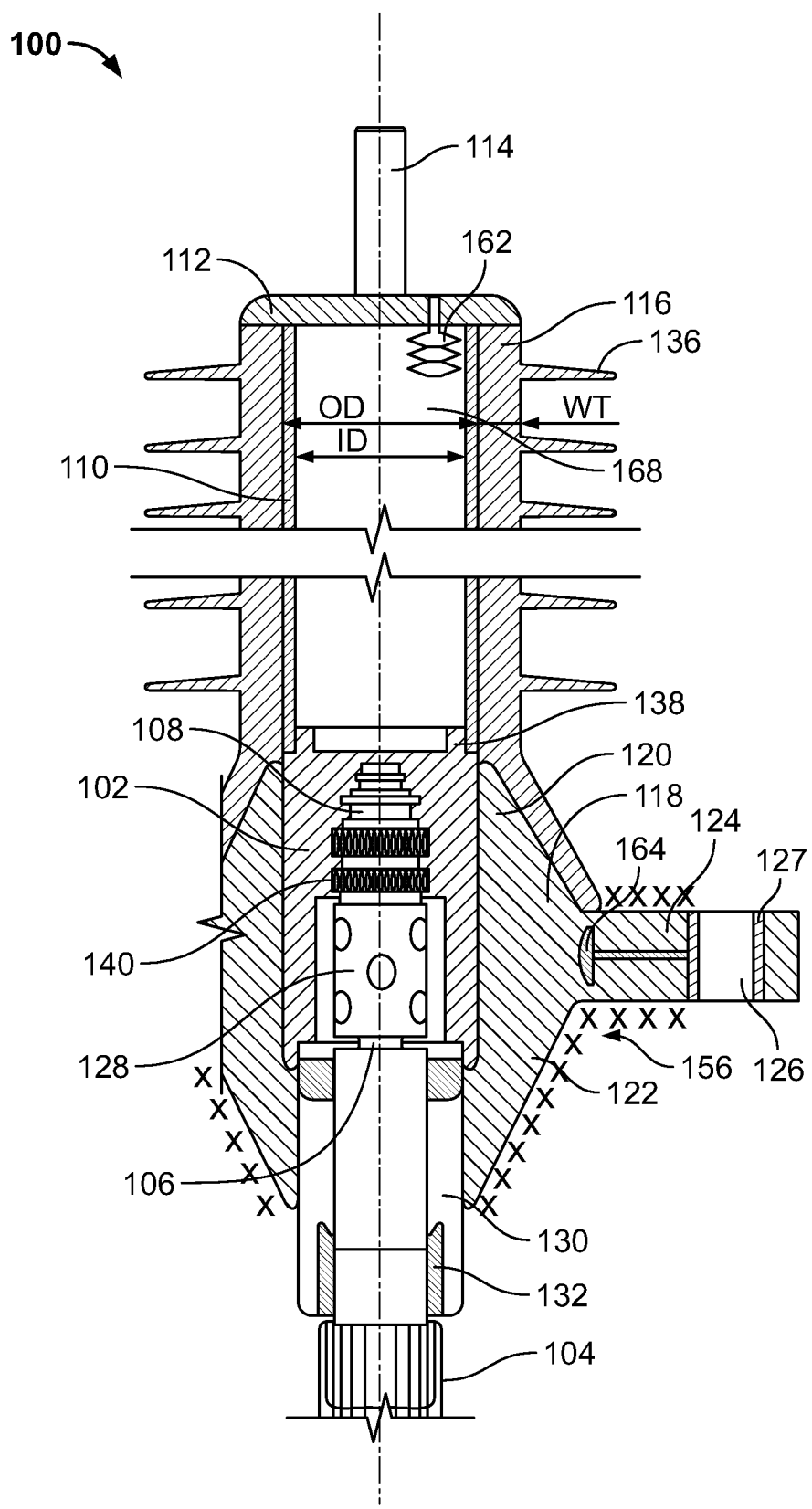
FIG. 2 is a sectional side view of a termination according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will convey the concept of the disclosure to those skilled in the art.

Furthermore, several aspects of the embodiments may form—individually or in different combinations—solutions according to the present invention. The following described embodiments thus can be considered either alone or in an arbitrary combination thereof. Further features and advantages will become apparent from the following more particular description of the various embodiments of the invention.

A termination 100 according to an embodiment is shown in FIG. 2. The termination 100 is built symmetrically and therefore only the right half is shown fully, the left half is formed correspondingly.

The termination 100, as shown in FIG. 2, comprises a connection portion which in the present embodiment is formed by a connector bushing 102 that can be connected to a cable 104. An inner conductor 106 of the cable 104 is connected to a connector cone 108 that can be attached to the connector bushing 102 by a press-fit connection. Thereby, electrical and mechanical connection between the termination 100 and the cable 104 is established. The termination 100 further comprises an electrically conductive mechanically rigid tube 110 that extends through the length of the termination 100 to be connected with a top plate 112. The top plate 112 has a conductor shank 114 projecting from a top end of the termination 100, to which an overhead conductor can be connected through a respective clamp or the like. The top plate 112 may be electrically conductive or insulating; if it is conductive, it can directly provide the connection between the shank 114 and the electrically conductive mechanically rigid tube 110.

As shown in FIG. 2, an elongated insulating housing 116 covers and protects the rigid conductive tube 110; the insulating housing 116 has an electrically tight interface with the conductive tube 110. For fastening a first section of the termination 100 at a mounting base, for instance at a support pylon, the termination has an electrically insulating, mechanically rigid fastening ring 118 that encompasses the connector bushing 102. By forming the electrical duct from the top plate 112 to the cable 104 as a rigid conductive tube 110, and the connection portion that is in contrast by the rigid fastening ring 118, axial and radial forces that are acting on the termination 100 can be safely transferred to the mounting base. The first section of the termination 100 at which the fastening ring 118 is disposed is arranged between the top end of the termination 100 at the top plate 112 and a second end of the termination 100.

The fastening ring 118, as shown in FIG. 2, has a first conical region 120 and a second conical region 122 which support a mounting flange 124. The mounting flange 124 has one or more openings 126 for screwing the mounting flange 124 to a mounting base on a pylon or termination rack. In another embodiment, the rigid fastening ring 118 is connectable to a separate mounting flange 124 part for a mechanical load transfer to the mounting base by screwing, press-fitting, welding, or the like.

An electric duct shown in FIG. 2, formed by the conductive tube 110 and the connector bushing 102, interacts with the rigid fastening ring 118 in order to transfer longitudinal and transversal forces, which act on the termination 100, towards the mounting base. The termination 100 is therefore mechanically self-supporting and can also be installed in an angled position, e.g. with 45° against the vertical direction. In an embodiment, an aluminum tube 110 with an outer diameter OD of 125 mm and an inner diameter ID of 100 mm is sufficiently stable and rigid to take the mechanical load that is acting on termination 100 in its application environment.

The insulating fastening ring 118 is fabricated by overmolding the connector bushing 102 with a rigid resin (for instance epoxy resin). The epoxy resin may also be charged with high-resistant fibers, silica powder, or similar materials adapted to give mechanical strength and dimensional stability. Furthermore, electrically conductive, such as metallic, inserts 127 can be provided inside the openings 126 during the overmolding step.

The insulating housing 116, shown in FIG. 2, may for instance be fabricated from silicone and does not have to provide mechanical support. For rated voltages of up to 170 kV it could be shown that a wall thickness WT of about 35 mm is advantageous. For a person skilled in the art it is of course clear that other dimensions may also be used. The wall thickness may vary over the length of the housing 116. The insulating housing 116 may for instance be molded over the aluminum tube 110. Alternatively, the insulating housing 116 can also be fabricated as a separate part and can be slid over the electrically conductive tube 110 similar to a cold shrink sheath. One or more sheds or fins 136 are provided for extending the creeping current distance along the outer surface of the housing 116. The insulating housing 116 may be fabricated from an elastomeric material and is in tight contact with the electrically conductive tube 110. The elastomeric material may comprise silicone which is molded or shrunk over the electrically conductive tube 110.

The cable 104 may be equipped with a connector cone 108, as shown in FIG. 2. The inner cable conductor 106 is connected with the connector cone 108 by a screwed connector 128. The electrical contact between the connector cone 108 and the connector bushing 102 is established by using at least one electrical contact, for instance a coil spring 140. The coils of the spring 140 serve as multiple contact points for optimal conductivity, ensuring consistent and reliable connection even under shock and vibration.

In order to achieve an optimal transition between the termination 100 and the cable 104, the termination 100 can further comprise at least one adapter 130 as shown in FIG. 2. The adapter 130 may be fabricated from silicone and may further comprise field control elements 132. The termination 100 may be used for different cable diameters by only using cable specific adapters 130 but leaving the remaining termination 100 unchanged for the whole range of envisaged cable diameters.

As shown in the embodiment of FIG. 2, the top plate 112 has a pressure release device 162 for balancing a pressure of the air 168 inside the conductive tube 110. The pressure release device 162 may for instance comprise a diaphragm or any other suitable pressure balancing structure.

As shown in FIG. 2, the mounting flange 124 of the electrically insulating rigid fastening ring 118 has a plurality of openings 126 for receiving, for example, screws or bolts that attach the fastening ring 118 to the mounting base. An inner surface of the openings 126 is electrically conductive, e.g. comprising a metallic insert 127 or a metallic coating, and the fastening ring 118 further comprises an electrically conductive electrode ring 164 that electrically interconnects the metallic inserts or electrically conductive coatings of the openings 126. In addition to electrically interconnecting, the electrode ring 164 may also provide an improved mechanical stability to the mounting flange 124. The electrode ring 164 is for instance overmolded by the epoxy resin when fabricating the fastening ring 118. The outer surface of the fastening ring 118 may optionally be provided with a conductive coating 156. The conductive coating 156 is terminated in the upper area of the outer cone interface. As shown in the FIGS. 5 and 6 it is proposed to mold-in a rounded shape at its end that is coated with the conductive coating 156.

Figure 3:
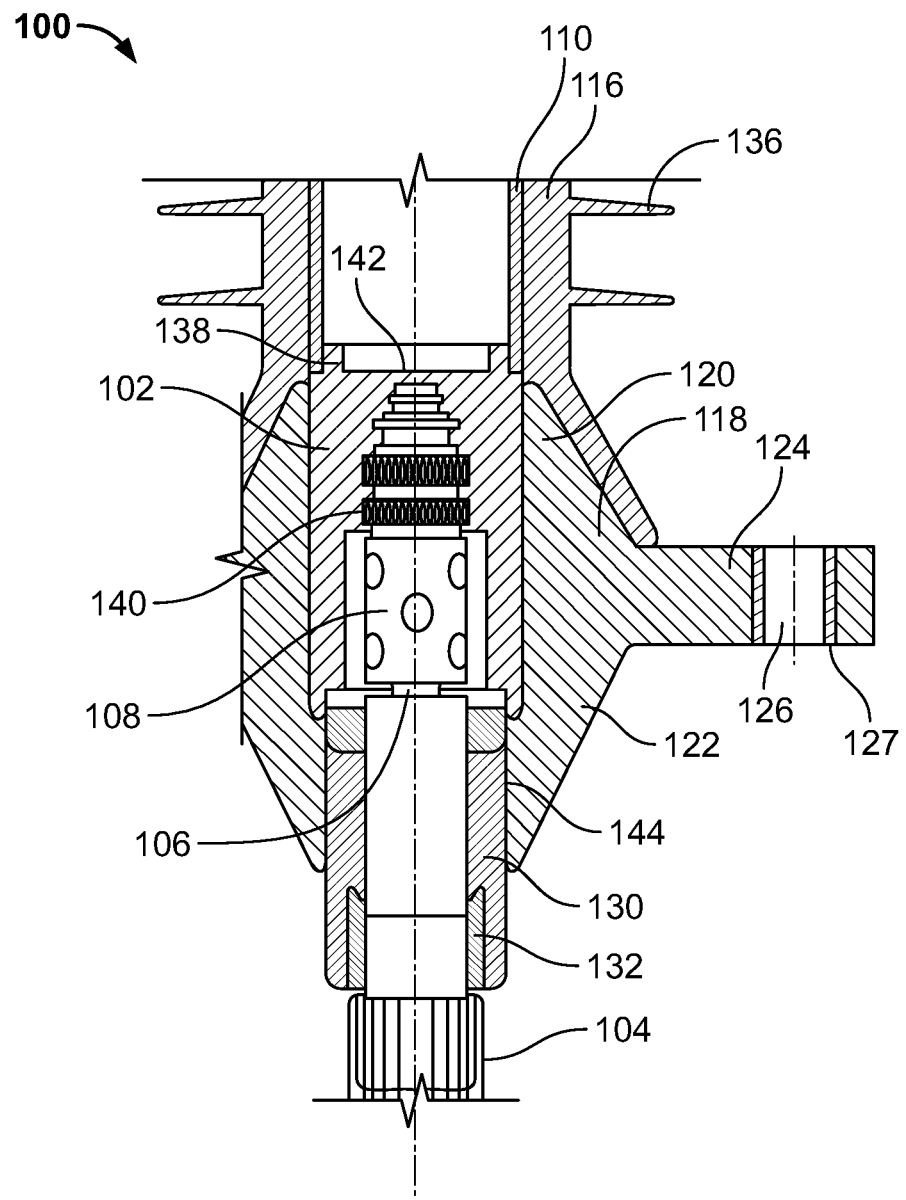
FIG. 3 is a sectional side view of a termination according to another embodiment.

As shown in FIG. 3, the electrically insulating fastening ring 118 has two tapered sections: a first cone-shaped region 120 and a second cone-shaped region 122, which are joined together by the mounting flange 124. The connector bushing 102 is formed by a turned aluminum part which is overmolded by the epoxy resin. In other embodiments, any other suitable connector material fabricated from one or more components may also be used as the connector bushing 102. The connector bushing 102 has a recessed fitting region 138 which is connected to the rigid conductive tube 110. The fitting region 138 allows a press-fit of a peripheral end of the conductive tube 110 around the fitting region 138 of the connector bushing 102. In other embodiments, a screw fit or a solder connection can be used for interconnecting these two parts. Furthermore, the rigid conductive tube 110 and the connector bushing 102 may also be fabricated as one single piece forming the electric duct through the termination 100.

The connector bushing 102 interacts with the connector cone 108 that is attached to the inner cable conductor 106 of the cable 104. Coil springs 140 provided at the connector cone 108 interact with corresponding grooves inside the connector bushing 102 and establish a non-detachable fit between the termination 100 and the cable 104. In other embodiments, a detachable connection can be provided. For instance, a screw connection can be provided which passes through the top 142 of the connector bushing 102 and detachably fixes the peripheral end of connector cone 108. Also a snap fit connection arranged above the top 142 of the connector bushing 102 can be used.

The termination 100, as shown in FIGS. 2 and 3, has a first adapter 130 that fits over the screen and the insulation layer of the cable 104, and provides field control by electrically semiconductive field control elements 132. An outline 144 of the first adapter 130 may be straight cylindrical as shown in FIG. 3 or tapered to form a conical outline, or have any other suitable contour. The conical outline 144 may firstly be oriented with the smaller diameter being arranged closer to the connector cone 108. In this case, an additional spring loaded compression ring is needed for keeping together the connection under all environmental conditions (from −50° C. to 80° C.). Alternatively, the adapter 130 may also be tapered to have the larger diameter arranged adjacent to the connector cone 108. This geometry locks the adapter 130 within the second cone shaped region 122 of the fastening ring 118 without needing an additional spring loaded compression ring.

Figure 4:
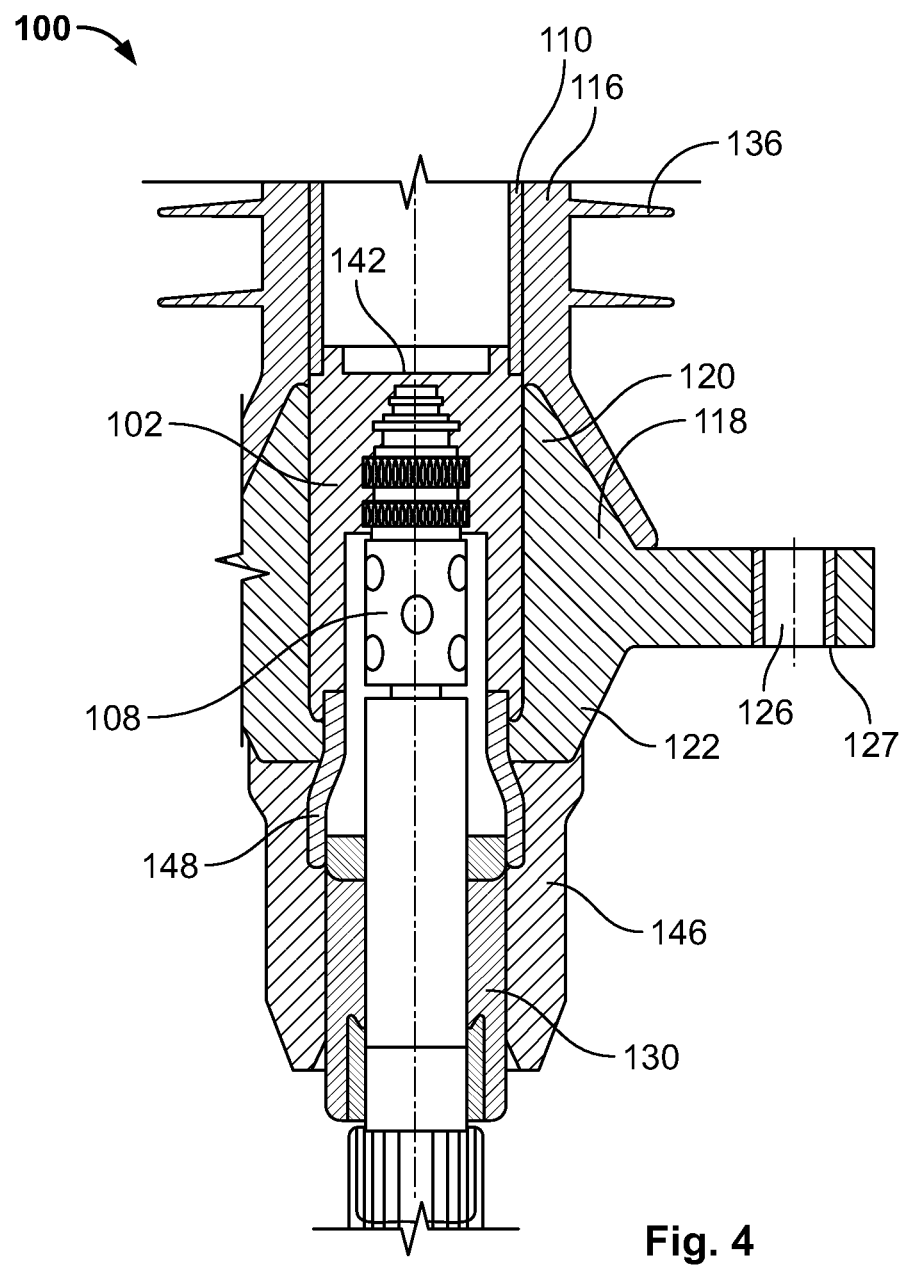
FIG. 4 is a sectional side view of a termination according to another embodiment.

A termination 100 according to another embodiment is shown in FIG. 4. The connector bushing 102, the first cone-shaped region 120, and the complete upper part of the termination 100 are the same as explained with reference to FIGS. 1 and 2. However, the second cone-shaped region 122 of the rigid conductive tube 118 has an elongated extender part 146 which is formed from an elastic material, such as silicone. The first adapter 130 is covered by the extender part 146, ensuring a tighter grip and a smoother transition to the cable's outer surface. A further ring-shaped field control element 148 covers the transition from the inner surface of the connector bushing 102 to the outer surface of the first adapter 130.

Figure 5:
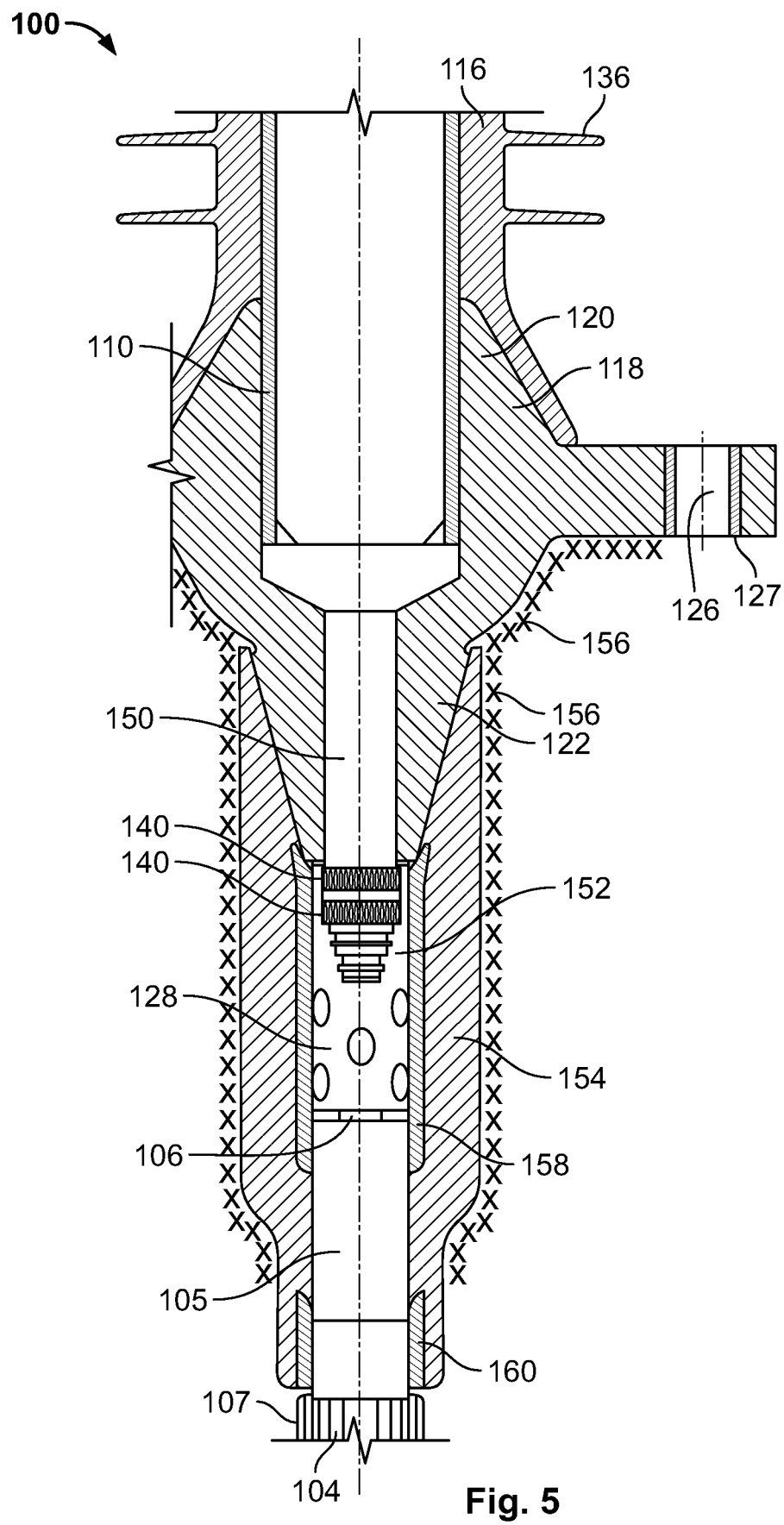
FIG. 5 is a sectional side view of a termination according to another embodiment.

A termination 100 according to another embodiment is shown in FIG. 5. In contrast to the previously shown embodiments, the conductive tube 110 is connected to a termination connector cone 150 instead of the connector bushing 102. In other words, the electric duct leading from the inner cable conductor 106 to the connector shank 114 or the top plate 112 comprises the rigid conductive tube 110 and the termination connector cone 150. Correspondingly, the cable 104 is not fitted with a cone, but with a mating connector receptacle 152 instead. The inner cable conductor 106 of the cable 104 is attached to the connector receptacle 152 by a screwed connector 128. A crimp connection or any other type of connection is of course also possible. Coil springs 140, such as Bal Seal springs, or canted coil springs, are used for establishing a robust and low-ohmic electric contact between the termination connector cone 150 and the connector receptacle 152.

The termination 100 shown in FIG. 5 has a fastening ring 118 with an elongated cone-shaped region 122 that encompasses the termination connector cone 150. This design can be combined with an outer cone adapter 154 that is arranged around the end of the cable 104 and the termination 100. Thereby, the cable connector does not need a spring loaded compression ring as this is the case for the conventional arrangement shown in FIG. 1A or in the embodiment shown in FIG. 3 in case the adapter is conical.

As shown in FIG. 5, the outer surfaces of the fastening ring 118 and of the outer cone adapter 154 can be provided with an electrically conductive coating 156. A further field control element 158 is arranged in a transition region extending from the peripheral end of the cone shaped region 122 along the connector receptacle 152 to the inner insulation 105 of the cable. A deflector 160 is provided in the region overlapping the cable insulation screen.

To hold the adapter 154 in place, ridges on the inside of the adapter 154 can fit into grooves in e.g. the connector or that fit into a purposely left slit between connector and cable insulation or between connector and outer cone. It is also possible to hold the adapter 154 in place from the outside e.g. by having ridges on the outside and using a metal or plastic housing screwed onto the lower end of the termination 100 which has corresponding ridges. A further option is to push the adapter 154 by a grounding connector that is attached to the screen 107 of the cable 104. In all cases, the adapter and/or the gap between a housing and the cable is covered with an additional sleeve (heatshrink, cold shrink, push-on, not shown in the Figures).

The conical region 122 shown in FIG. 5 may also have a straight cylindrical outline or a conical outline with the larger diameter located at the end close to the Bal Seal springs 140. The latter alternative ensures a more secure fitting under all temperature conditions. The termination connector cone 150, in an embodiment, may also be formed integrally with the tube 110.

As shown in FIG. 5, an outer conductive coating 156 of the epoxy resin may be provided. The coating 156 is to be terminated at its ends in an appropriate manner: e.g. a molded-in stress cone shape or separate elastomeric stress cone parts slid into position. At the lower end, the coating 156 can be terminated in any manner as long as it is behind the deflector 160 of the adapter 154. The connector 128 can also be installed at the termination connector cone 150 before inserting a cable because the tear-off screws fixing the inner cable conductor 106 inside the connector 128 remain accessible as long as the outer adapter 154 is not yet installed.

Figure 6:
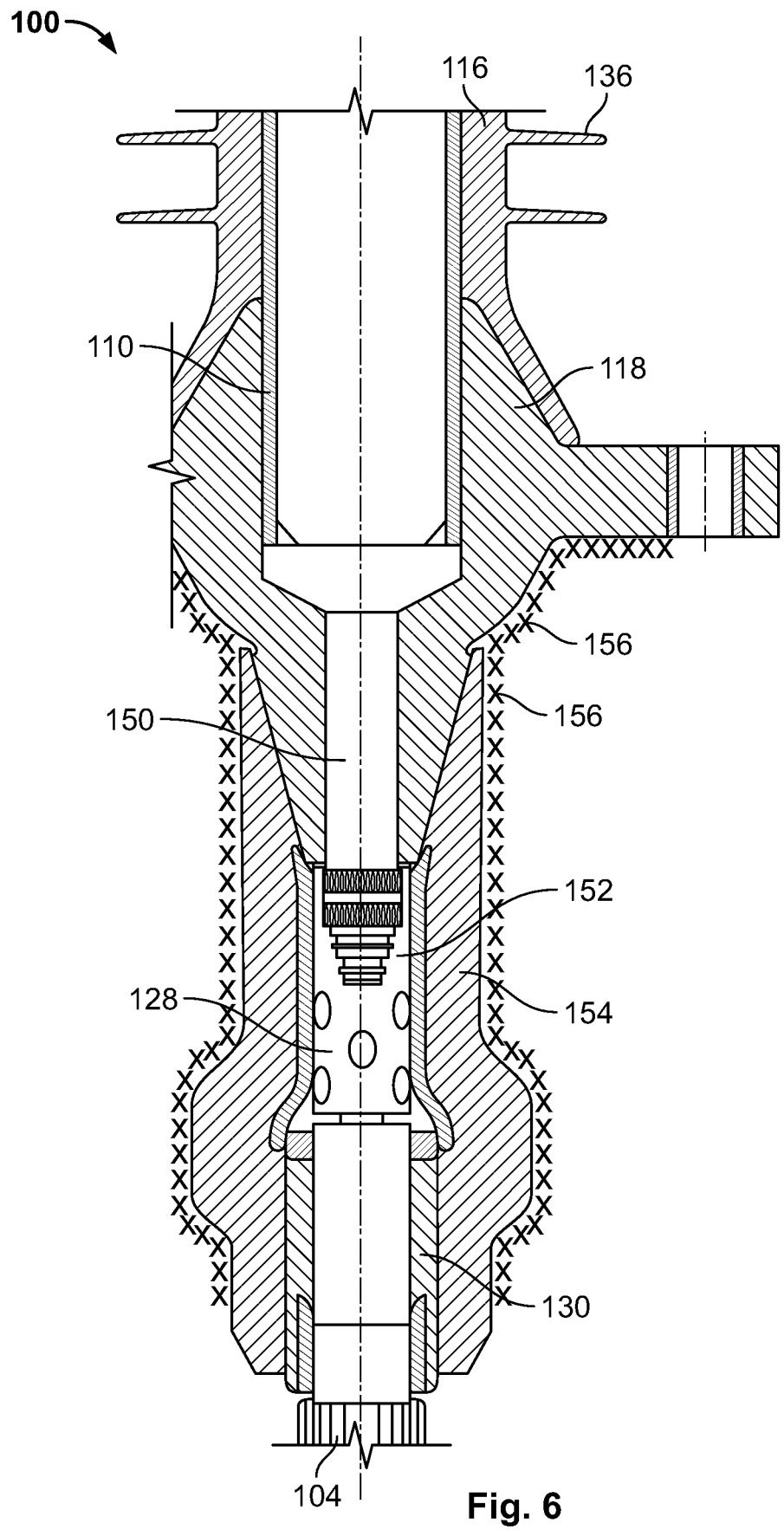
FIG. 6 is a sectional side view of a termination according to another embodiment.

A termination 100 according to another embodiment is shown in FIG. 6. An electric duct inside the termination 100 includes the rigid conductive tube 110 and the termination connector cone 150 which may for instance be welded together. The inner cable conductor 106 is provided with a mating connector receptacle 152. The rigid fastening ring 118 transfers the mechanical forces to a mounting base.

In contrast to the embodiment of FIG. 5, according to the embodiment of FIG. 6 an inner adapter 130 and an outer adapter 154 are provided to cover the transition between the cable 104 and the termination connector cone 150. For adapting the termination 100 to different cable diameters, only the smaller adapter 130 has to be exchanged. As with the embodiment shown in FIG. 5, the connector 128 can also be installed at the termination connector cone 150 before inserting a cable because the tear-off screws fixing the inner cable conductor 106 inside the connector 128 remain accessible as long as the outer adapter 154 is not yet installed.

Figure 7:
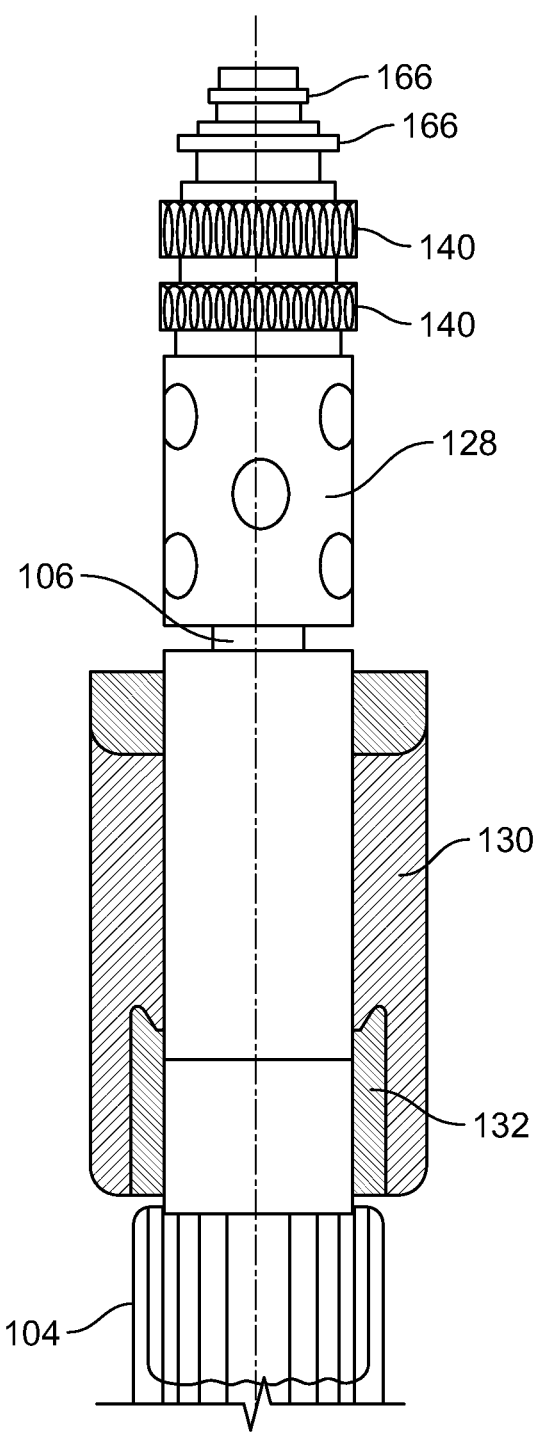
FIG. 7 is a sectional side view of a cable with a cable connector and an adapter according to an embodiment.

The cable 104 with the connector cone 108 of FIGS. 2-4 is shown in FIG. 7. Current is transmitted via coil spring elements 140. The mechanical load is transmitted via fixing elements which are formed, for example, as metal rings 166 that fit into corresponding grooves in the metal connector bushing 102 and which can be radially compressed during the insertion into the metal connector bushing 102. This connection cannot be disconnected again, but is of low cost.

The connection of the cable conductor 106 to the termination can also be done in different ways. One option is to use a standard connector which is screwed (or crimped) on the conductor 106 of the cable and then it is screwed (crimped) to a metal rod forming the termination connector cone 150 and standing out of the termination at its lower end. The adapter is then slid into position. The adapter may be parked over the sheath or the conductive layer. If using a further adapter as described above, same may be easily parked over the sheath.

In all embodiments described above, the metal tube 110 may be made from standard or rigid aluminum alloys. An internal diameter ID may be e.g. 100 mm. In order to take up forces of 5 kN at the top and to have a length of about 1.5 m, the wall thickness may be 12 mm. The resulting cross section of about 4000 mm$^2$ is sufficient to transmit the current of 2500 mm$^2$ copper cables.

The overmolded insulating housing 116 of the metal tube 110, in an embodiment, is 35 mm along its entire length to cope with 170 kV requirements. This still consumes much less silicone molding material than the conventional oil filled termination. Filling oil and molding material generally have about equal costs.

In the termination 100, with the electrical duct inside the mechanically rigid tube 110 of larger diameter, the tube 100 is able to carry the entire load by itself. A resin molding 118 is required only in the middle section to establish the mechanical connection to the support structure. The hollow tube 110 is sufficient for providing a satisfactory electrical connection between the cable connector 102 and the top plate 112; no massive rod or cable is needed inside the termination 100. In an embodiment, the electrical duct is adapted to carry more than 97% of the current that is to be transmitted from the cable 104 to the overhead line (some residual current may flow on stray current paths). However, by additionally feeding the cable conductor 106 through the termination 100, the electrical duct may also carry only about above 50% of the current.

The present invention provides a termination 100 that carries the mechanical loads by the conductor rather than the insulation and where the electrical shield/insulation of the connection to the cable is done through elastomeric members, which are easy to install via push-on techniques. The termination 100 is cost efficient, low weight, reliable, and mechanically robust. The assembly process is fast and easy, and, in particular, no liquids have to be handled in the field. Nevertheless, the electrical and safety requirements regarding terminations for 72-170 (245) kV can be met.

In another embodiment, a termination system includes the cable connector 108, 152 attached to the high-voltage cable 104 and the termination 100.

What is claimed is:

1. A termination for a high-voltage electric cable, comprising:
   an insulating housing;
   a fastening device fastening a first section of the termination to a mounting base, the fastening device is a fastening ring that is electrically insulating and rigid;
   an electrical duct extending inside the insulating housing along a longitudinal axis of the insulating housing from the first section to a top end of the termination, the first section arranged between the top end of the termination and a second end of the termination, the electrical duct includes an electrically conductive tube and a connection portion attaching to a cable connector of the high-voltage electric cable, the fastening ring at least partly encompasses the electrical duct; and
   a conductor shank disposed at the top end for fastening an electrical conductor to the electrical duct.

2. The termination of claim 1, wherein the fastening ring has a mounting flange connected to the mounting base.

3. The termination of claim 1, wherein the fastening ring is connectable to a mounting flange by screwing, press-fitting, or welding.

4. The termination of claim 1, wherein the connection portion includes a connector bushing that electrically contacts and at least partly encompasses a connector cone forming the cable connector in a mounted state of the high-voltage electric cable.

5. The termination of claim 4, wherein the connector bushing is separate from the electrically conductive tube and the connector bushing and the electrically conductive tube are mechanically and electrically connected by a press fit, a solder connection, a welding connection, or a screw connection.

6. The termination of claim 1, further comprising an adapter inserted between the high-voltage electric cable and an inner surface of the fastening ring.

7. The termination of claim 1, wherein the connection portion includes a termination connector cone attached to the electrically conductive tube, the termination connector cone is electrically connected and at least partly encompassed by a connector receptacle forming the cable connector in a mounted state of the high-voltage electric cable.

8. The termination of claim 7, wherein the fastening ring has a cone shaped region surrounding the connector cone, an electrically insulating tube shaped outer adapter contacts and encompasses at least a part of the connection portion, at least a part of the high-voltage electric cable, and at least a part of the fastening ring in a mounted state of the high-voltage electric cable.

9. The termination of claim 8, further comprising an inner adapter disposed between the high-voltage electric cable and an inner surface of the electrically insulating tube shaped outer adapter.

10. The termination of claim 1, wherein the fastening ring is fabricated from an epoxy resin.

11. The termination of claim 1, wherein the insulating housing is fabricated from an elastomeric material and is disposed outwardly from a central axis of the termination and around the electrically conductive tube.

12. The termination of claim 1, wherein the insulating housing has an electrically tight interface with the electrically conductive tube.

13. The termination of claim 11, wherein the elastomeric material is a silicone that is molded or shrunk over the electrically conductive tube.

14. The termination of claim 2, wherein the mounting flange has a plurality of openings receiving a plurality of screws that attach the fastening ring to the mounting base, an inner surface of each of the openings is electrically conductive.

15. The termination of claim 14, wherein the fastening ring has an electrically conductive electrode ring electrically connecting the inner surfaces of the openings.

16. The termination of claim 1, wherein the insulating housing has an outer surface with a plurality of sheds.

17. The termination of claim 1, wherein the electrically conductive tube is formed from aluminum.

18. The termination of claim 1, further comprising a pressure release device adapted to balance a pressure inside the electrically conductive tube.

19. A termination system, comprising:
a cable connector attached to a high-voltage cable; and
a termination including an insulating housing, a fastening device fastening a first section of the termination to a mounting base, the fastening device is a fastening ring that is electrically insulating and rigid, an electrical duct extending inside the insulating housing along a longitudinal axis of the insulating housing from the first section to a top end of the termination, the first section arranged between the top end of the termination and a second end of the termination, the electrical duct includes an electrically conductive tube and a connection portion attaching to the cable connector, the fastening ring at least partly encompasses the electrical duct, and a conductor shank disposed at the top end for fastening an electrical conductor to the electrical duct.

20. The termination system of claim 19, wherein the cable connector is mounted at the termination by a thread and nut arrangement or a form-fitting arrangement.

21. The termination system of claim 19, wherein the cable connector is mounted inside the termination before mounting the cable.

22. The termination system of claim 19, wherein the cable connector is disposed between a first end and a second end of the termination or is disposed at the first end or the second end of the termination.

* * * * *